United States Patent [19]

Caldwell et al.

[11] Patent Number: 4,542,866
[45] Date of Patent: Sep. 24, 1985

[54] AIRCRAFT WITH DIRECTIONAL CONTROLLING CANARDS

[75] Inventors: Allan L. Caldwell; Richard Hardy, both of Seattle; Frank D. Neumann, Bellevue, all of Wash.

[73] Assignee: The Boeing Company, Seattle, Wash.

[21] Appl. No.: 537,487

[22] Filed: Sep. 30, 1983

[51] Int. Cl.[4] .......................... B64C 5/04; B64C 5/12; B64C 5/16
[52] U.S. Cl. .................... 244/45 A; 244/91; 244/49
[58] Field of Search ............... 244/45 R, 45 A, 90 R, 244/91, 87, 80, 140, 46, 47, 49, 13

[56] References Cited

U.S. PATENT DOCUMENTS

| | | | |
|---|---|---|---|
| 3,152,775 | 10/1964 | Boyd | 244/13 |
| 3,642,234 | 2/1972 | Kamber et al. | 244/45 |
| 3,680,816 | 8/1972 | Mello | 244/46 |
| 3,730,458 | 5/1973 | Haberkorn | 244/43 |
| 3,881,671 | 5/1975 | Bouchnik | 244/140 |
| 3,883,094 | 5/1975 | Mederer | 244/45 |
| 4,247,062 | 1/1981 | Brueckner | 244/91 |
| 4,336,914 | 6/1982 | Thomson | 244/46 |
| 4,354,646 | 10/1982 | Raymer | 244/87 |
| 4,357,777 | 11/1982 | Kulik | 46/80 |

FOREIGN PATENT DOCUMENTS 2025341 1/1980 United Kingdom .

Primary Examiner—Galen L. Barefoot
Attorney, Agent, or Firm—Bruce A. Kaser; Delbert J. Barnard

[57] ABSTRACT

A pair of canards (18, 20) are mounted to the fuselage (22) of an aircraft (10). Each canard is mounted to the fuselage by a hinge (44) for vertical swinging movement. Connected to the hinge (44) is a trunnion (72) about which the canard rotates for incidence adjustment. The hinge (44) for each canard is independently powered by a drive motor (58) enabling the canards (18, 20) to be vertically moved either symmetrically or asymmetrically. Incidence is changed by a rotary actuator housed within the trunnion (72) for each canard. The rotary actuator for each canard is independently operable enabling the canards (18, 20) to be symmetrically or asymmetrically rotated.

9 Claims, 10 Drawing Figures

Fig. 2B SUPERSONIC MANEUVER MODE

Fig. 2C DIRECT SIDE FORCE CONTROL MODE

Fig. 2A CRUISE MODE LOW RCS LOW DRAG

AIRCRAFT WITH DIRECTIONAL CONTROLLING CANARDS

TECHNICAL FIELD

The present invention relates to the provision of an aircraft having canards which (1) are retractable flush against the side of the fuselage for low drag and observables, (2) are deployable symmetrically in near-vertical position with variable incidence for directional trim and control functions, such as fuselage aiming, and (3) are deployable asymmetrically with variable incidence as appropriate for combined pitch, roll, and directional trim and control functions.

BACKGROUND ART

It has always been a goal of aircraft designers to improve the steering and maneuvering capability of aircraft. Improving steering and maneuvering is especially important for small supersonic aircraft. This is because they often have special requirements related to their ability to "track" or "aim" their fuselage in a particular desired direction. Associated with this is a further requirement to change "tracking" or "aiming" direction quickly.

A problem with such aircraft is that when flying at supersonic speeds, their fuselage experiences an aft shift of its aerodynamic center. Such a shift causes the aircraft to have a highly static stabilization in the longitudinal direction which adversely affects the maneuverability of the aircraft. To solve this problem, designers have developed canards, attached to external portions of the fuselage, for controlling the location of the aerodynamic center. Although canards are effective for this purpose, their use has created another problem; that is, they significantly contribute to the drag and observables of the aircraft. Therefore, an object of the present invention is to provide improved canards that increase the steering and maneuvering capability of an aircraft, and at the same time minimize the drag and observables.

The following U.S. patents disclose various past methods of employing canards and other external control surfaces: U.S. Pat. No. 3,152,775, granted to Boyd; U.S. Pat. No. 3,642,234, granted to Kamber et al; U.S. Pat. No. 3,680,816, granted to Mello; U.S. Pat. No. 3,730,458, granted to Haberkorn; U.S. Pat. No. 3,881,671, granted to Bouchnik; U.S. Pat. No. 3,883,094, granted to Mederer; U.S. Pat. No. 4,247,062, granted to Brueckner; U.S. Pat. No. 4,336,914, granted to Thomson; U.S. Pat. No. 4,354,646, granted to Raymer; U.S. Pat. No. 4,357,777, granted to Kulik.

Particularly pertinent to the present invention is Haberkorn, U.S. Pat. No. 3,730,458, and Mederer, U.S. Pat. No. 3,883,094. Haberkorn relates to a jet-controlled aircraft that has trim and control fins. The fins unfold from a position flush against the fuselage to a position extending laterally therefrom, with the fins further having the capability of holding any position inbetween. In addition, when the fins are in the laterally extending position, they have the ability to pivot about a "Y" axis which is perpendicular to the longitudinal axis of the aircraft.

In a manner similar to the present invention, Haberkorn discloses a pair of fins or canards which are rotatable about said "Y" axis. However, a disadvantage to Haberkorn is that no provision is made for any such rotation of the canards when in intermediate positions between the folded and lateral positions. In conjunction with this, another disadvantage is that one canard does not have the capability to rotate independently from the other. A further disadvantage to Haberkorn is that the canards do not have the capability to move from a fully folded position against the fuselage to a downwardly extending position relative to the fuselage.

Mederer discloses a foldable canard assembly that includes a pair of canards folded together as a single canard extending vertically downward from the fuselage. The canards unfold to a position extending laterally from the bottom of the fuselage, but cannot fold into a retracted position against the fuselage.

A disadvantage to this assembly is that the canards have only one degree of freedom for pivotal movement. They cannot pivot rotationally when in the downward vertically extending position, and further, they cannot rotate when the canards are in the lateral position, or any position in between. Another disadvantage to the Mederer assembly is that since the canards cannot retract against the fuselage, they increase the drag and observables of the aircraft.

The above-mentioned disadvantages, and the advantages of the present invention, will become apparent upon further reading of this application.

DISCLOSURE OF THE INVENTION

According to the present invention, a pair of canards are mounted to an aircraft fuselage, one forwardly of each wing. A first mounting means for each canard mounts the canards for vertical swinging movement between a retracted position flush against the side of the fuselage and a downwardly extending position. Each of said mounting means is spaced a substantial distance apart from the other, said mounting means being located on opposite sides of the fuselage. A first positioning means swings each canard and holds it into a selected position within the range of possible vertical positions. The first mounting means enables each canard to extend downwardly such that it is substantially parallel to the "z" axis of the aircraft, such axis to be defined in that portion of this application which sets forth the best mode for carrying out the invention.

A second mounting means for each canard mounts the canard such that it can rotationally change its incidence. The canard is rotated for changing incidence, and held in selected incidence, by a second positioning means.

Both said first and second positioning means are independently operable. The first positioning means permit the canards to be vertically positioned both asymmetrically and symmetrically. Likewise, the second positioning means permits the canards to be rotated for changing their incidence in either an asymmetric or symmetric manner.

A pair of fairings connected to the fuselage, and extending along a length thereof, one on each side, project outwardly from the fuselage and house the first mounting means for each canard on its side of the fuselage. The second mounting means and second positioning means for each canard are housed within the canards.

In preferred form, the first mounting means comprises a hinge having an inner portion connected to the fuselage and a movable outer portion. The first positioning means is connected to the hinge outer portion and comprises a drive motor which vertically swings each canard holding it in a selected position. Also connected to the movable outer portion of the hinge is the second mounting means which comprises a trunnion having first and second ends. The trunnion is attached to its first end to the outer portion of the hinge, and further, the trunnion defines an axis about which its canard rotates for incidence changing. Housed within the trunnion is the second positioning means which comprises a rotary actuator. This actuator has a powered torque shaft that extends from the second end of the trunnion. The powered torque shaft is joined to the canard and drives the canard about that axis which is established by the trunnion for changing incidence. Bearing means surrounds each trunnion and mounts the canard to the trunnion such that the canard is permitted to rotate about it.

In preferred form, the aircraft fuselage has a triangular cross-sectional configuration in the canard region. It has a relative broad base and sides which converge together as they extend upwardly from the base, against which the canards lay when retracted.

BRIEF DESCRIPTION OF THE DRAWINGS

Like reference numerals are used to denote like parts throughout the several views of the drawings, and:

FIG. 2A is a pictorial view of the aircraft and canards of FIG. 1 with the canards adjacent the fuselage in a cruising mode;

FIG. 2B is a pictorial view of the aircraft and canards of FIG. 1 with the canards in a laterally extending position for maneuvering at supersonic speed;

FIG. 2C is a pictorial view of the aircraft and canards of FIG. 1, with the canards in a vertically downwardly extending position for controlling direct side forces on the aircraft;

BEST MODE FOR CARRYING OUT THE INVENTION

Figure 1:
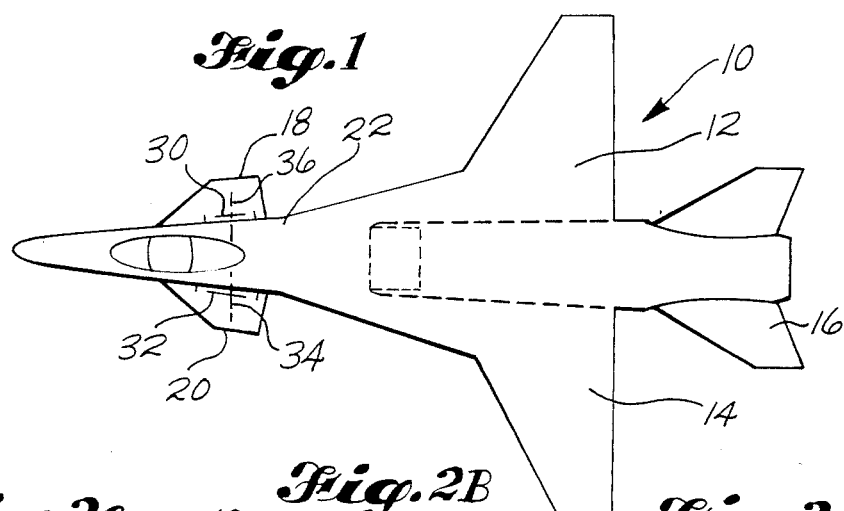
FIG. 1 is a top plan view of an aircraft showing a pair of canards mounted onto a forward portion of its fuselage, and showing the canards in a maneuver mode.
Figure 2:
FIG. 2 is a front elevational view of the aircraft, with the fuselage shown schematically, and the canards shown in three different positions.
Figure 2:
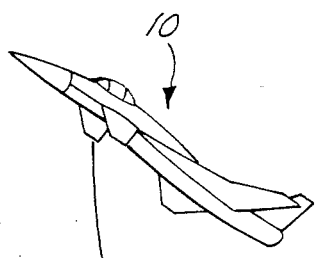
Figure 2:
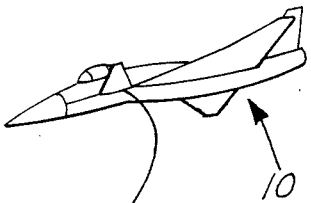
Figure 2:
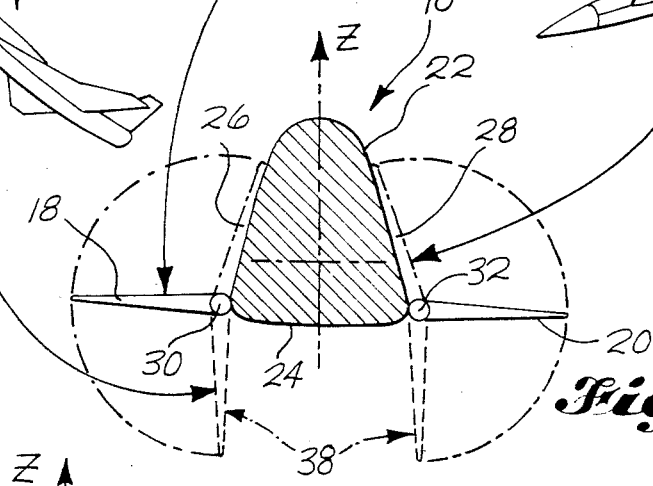
Figure 3:
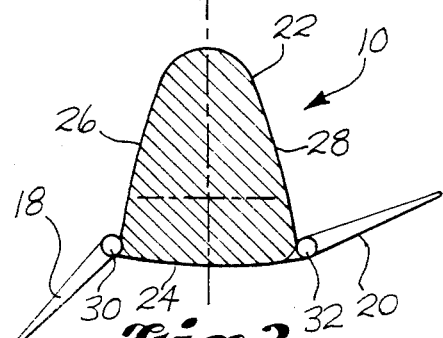
FIG. 3 is a view similar to FIG. 2, showing the canards in an asymmetric mode.

FIGS. 1–3 show a preferred embodiment of the invention incorporated into a supersonic fighter type aircraft 10 having wings 12, 14 and a tail section 16.

Figure 5:
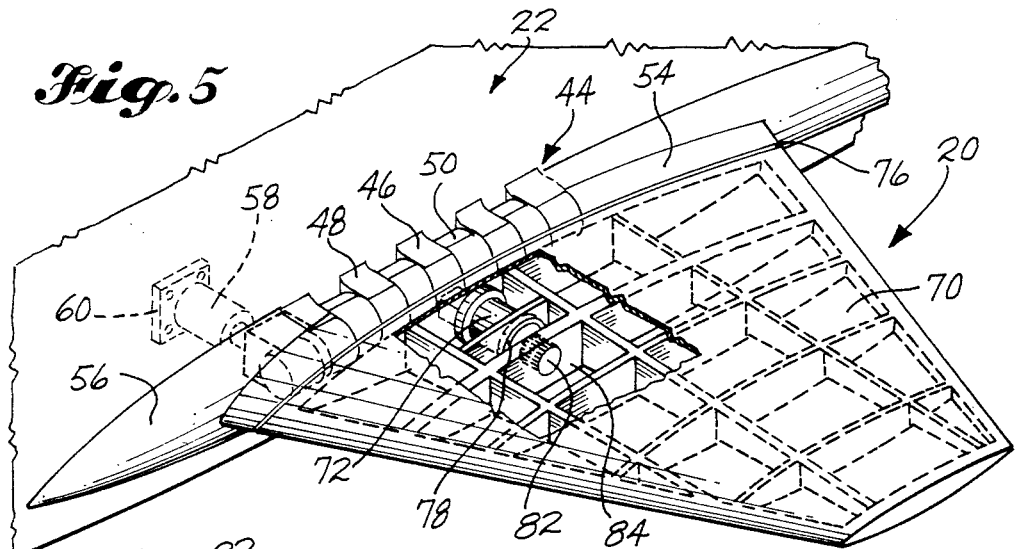
FIG. 5 is a fragmentary pictorial view of one of the canards, and an adjacent side portion of the fuselage, with a foreground upper surface portion of the canard cut away and a drive motor inside the fuselage shown by hidden lines.
Figure 7:
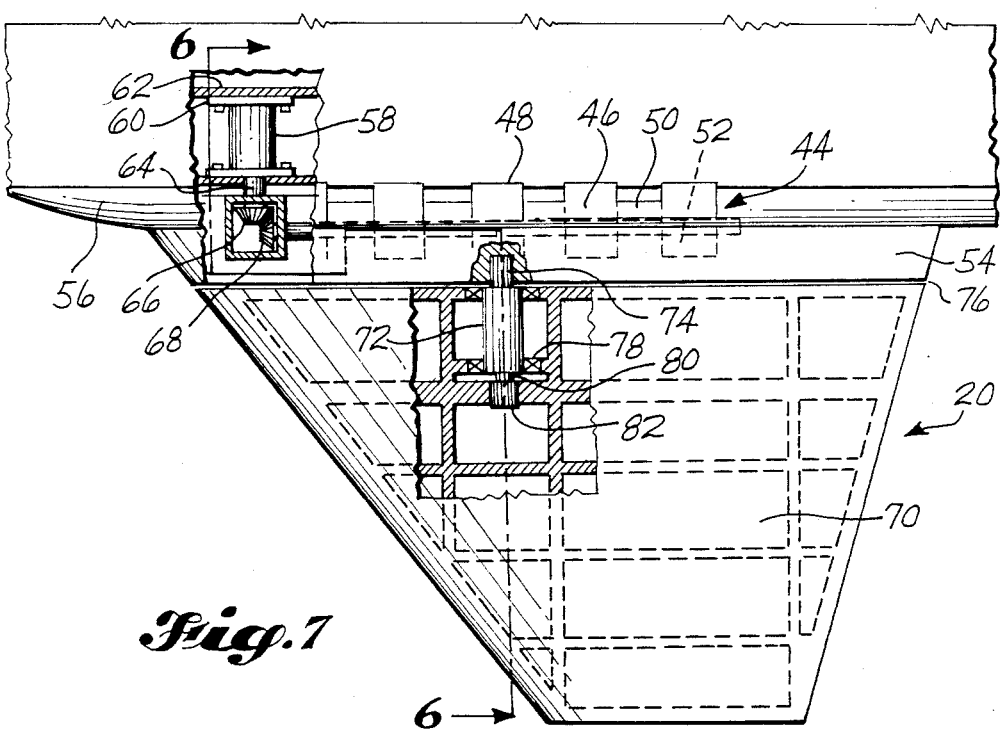
FIG. 7 is a fragmentary top plan view of the canard and fuselage presented in FIGS. 5 and 6, with portions of the fuselage and upper surface of the canard cut away.

In accordance with the present invention, the aircraft 10 is also provided with a pair of canards 18, 20, one positioned on each side of the fuselage 22, forwardly of the wing on its side of the fuselage 22. As shown in FIGS. 1, 5 and 7, the canards 18, 20 have generally trapezoidal plan form.

As best shown by FIGS. 2 and 3, in at least the canard region, the fuselage 22 has a generally triangular cross sectional shape. This shape is formed by a substantially flat base or bottom 24, and opposite sides 26, 28 which converge as they extend upwardly from the base 24. In the regions 26, 28 the side surfaces of the fuselage 22 closely conform to the shape of the upper surfaces of the canards 18, 20, so that the canards 18, 20 can be folded flat against the surfaces 26, 28, as will hereinafter be described in greater detail.

Canards 18, 20 are permitted two degrees of freedom. The first is a vertical swinging movement about axes 30, 32. As shown in FIG. 1, the axes 30, 32 extend generally fore and aft, generally where the base 24 of the fuselage 22 meets the sides 26, 28 of the fuselage. As best shown by FIGS. 2 and 3, the axes 30, 32 are positioned close to fuselage base level so that when the canards 18, 20 are extended horizontally, their lower surfaces are close to being a continuation of the lower surface of fuselage base 24. Also, with axes 30, 32 positioned thusly, when the canards 18, 20 are folded up against the fuselage side surfaces 26, 28, they make essentially no change in the cross sectional shape of the fuselage 22.

The second degree of freedom is a rotation about transverse axes 34, 36 (FIG. 1), for incidence adjustment. As shown in FIG. 1, axes 34, 36 extend generally perpendicular to axes 30, 32. The axes 36, 34 swing about axes 30, 32, respectively, as the canards unfold from the position flat against fuselage side surfaces 26, 28, as will be hereinafter discussed in greater detail.

The canards 18, 20 can vertically swing from a position flat or flush against fuselage side surfaces 26, 28 to a vertically downwardly extending position shown by arrows 38 in FIG. 2. The vertical positioning of the canards 18, 20 is dependent on the particular flight mode of aircraft 10. For example, when the aircraft 10 is in a cruising mode, it is desirable to minimize both the air drag and observables of the aircraft. Therefore, the canards are folded against fuselage side surfaces 26, 28 as depicted in FIG. 2A. When the aircraft 10 is flying at supersonic speeds, the canards 18, 20 are lowered to a horizontally extending position as shown in FIG. 2B. This horizontal position increases the maneuverability of aircraft 10 by countering the aft shift of the aerodynamic center of the fuselage 22. Another possible flight mode is to lower canards 18, 20 to a vertically downward position when it is desired to improve the ability of aircraft 10 to "track" or "aim" its fuselage. This mode is shown in FIG. 2C, and is further indicated by arrows 38 in FIG. 2. Having the canards 18, 20 deployed downwardly in such fashion, permits better aerodynamic control of side forces on the fuselage.

As was described hereinabove, the canards 18, 20 can extend from a position flush against fuselage 22 to a vertically downwardly extending position. For reference purposes, an axis designated generally as a "z" axis has been set forth in FIGS. 2 and 3. This axis extends generally vertical relative to fuselage 22 and is perpendicular to the longitudinal axis of aircraft 10. Canards 18, 20 can extend downwardly to a position which is substantially parallel to the "z" axis. In addition to the previously described canard positions for the various flight modes depicted in FIGS. 2A through 2C, the canards 18, 20 can also be vertically moved to any other position which is intermediate to the position flush against fuselage 22 and the vertically downwardly extending one.

Each canard 18, 20 is independently operable from the other for vertical swinging movement. Therefore, the canards can be deployed either symmetrically as discussed above, or, they can be deployed asymmetrically, as shown in FIG. 3.

The canards 18, 20 are rotatable for incidence changing or adjustment when in any of the above-discussed vertical swinging positions; the obvious exception being the position wherein the canards are flush against the fuselage side surfaces 26, 28. For example, when the canards are horizontally extended, as shown in FIG. 2B, the canards 18, 20 can be symmetrically rotated upwardly or downwardly for pitch control of aircraft 10. Furthermore, when the canards 18, 20 are in the vertical downward position depicted in FIG. 2C, the canards 18, 20 can be symmetrically rotated for controlling side forces on the fuselage 22. Such symmetric rotation enables the aircraft 10 to perform quick lateral or sideways maneuvers for changing fuselage "tracking" or "aiming" directions.

As discussed above, each canard is independently operable for vertical swinging movement. Likewise, each canard 18, 20 is independently operable for rotational incidence changing. Therefore, the canards 18, 20 could be rotated asymmetrically if so desired. As an example, when the canards are positioned in the horizontally extended position shown in FIG. 2B, canard 20 could be rotated upwardly as in the direction indicated by arrow 40 in FIG. 4, and canard 18 could be rotated downwardly as in the direction indicated by arrow 42 in the same figure. The canards 18, 20 could be asymmetrically rotated at any of the previously discussed vertical swinging positions, except for when the canards are substantially close to fuselage side surfaces 26, 28 whereby such rotational movement would be physically impossible.

Each canard 18, 20 is attached to the fuselage 22 in exactly the same way. Therefore, the discussion of the best mode for attaching the canards to the fuselage can be limited to the attachment of one canard 20 to fuselage 22 as is shown in FIGS. 5-7.

FIG. 5 shows canard 20 mounted to fuselage 22 for vertical swinging movement by a hinge 44. The hinge has a plurality of fixed inner knuckle portions 46 connected to fuselage 22 by a plurality of brackets 48. Alternating juxtapositionally with inner knuckle portions 46 are movable other knuckle portions 50. The movable knuckle portions 50 have outer portions 52 which are connected to an inner swinging portion 54 of the canard 20. Knuckle portions 46, 50 are housed by a fairing 56 which extends along a length of fuselage 22.

Figure 6:
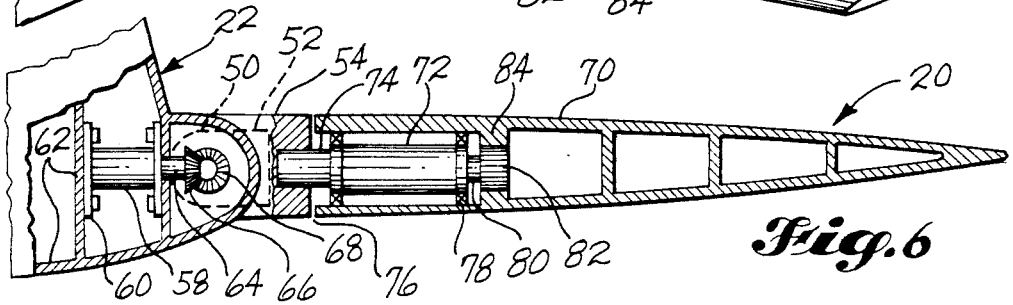
FIG. 6 is a sectional view substantially along line 6—6 of FIG. 7, with some parts in side elevation.

The hinge arrangement shown in FIGS. 5-7, so far as it has been described, is well known in so far as the deployment of canards are concerned. For example, a similar hinge arrangement is disclosed in U.S. Pat. No. 3,680,816 issued to Mello on Aug. 1, 1972. The movable knuckle portion 50 of hinge 44 is driven by a series of planetary gears (not shown in the figures), which are powered by a drive motor 58. the drive motor 58 is mounted by a flange 60 to a bracket 62 located inside fuselage 22. By way of example, the drive motor 58 could be either an electrical or hydraulic type motor. The drive motor 58 has a power shaft 64 with a bevel gear 66 attached to one end thereof. Bevel gear 66 drives another beveled gear 68. Bevel gear 68 is connected to the planetary gears that drive movable knuckle portion 50, which further moves outer portion 52 for vertically swinging canard 20.

Drive motor 58 has the capability to rotate power shaft 64 in either direction. This in turn moves hinge outer portion 52 for swinging canard 20 upwardly or downwardly. As was discussed above, the canard 20 can swing upwardly flush against side 28 of fuselage 22 or vertically downward to a position substantially parallel to the "z" axis of aircraft 10. Drive motor 58 moves canard 20 to either of these positions, or any position which is intermediate, and the motor holds the canard in any of such positions.

Mounted to inner swinging portion 54 of canard 20 is an outer swinging and rotating canard portion 70 attached to portion 54 by a non-rotating trunnion 72 having a joining member 74 extending from one end. The joining member 74, by way of example, could be a pin or a beam member which is fixedly connected to both canard portion 54 and trunnion 72.

The swinging and rotating outer portion 70 of canard 20 rotates about trunnion 72 for changing the angle of incidence of the canard. A break line 76 between canard portions 54 and 70 permits portion 70 to rotate relative to both the inner canard portion and the hinge and fairing structure. Rotation of outer portion 70 about trunnion 72 is permitted by means of bearings 78 which are connected to the outer surface of the trunnion. The trunnion 72 defines axis 34 in FIG. 1. As is plain from the above description, canard outer portion 70 swings upwardly and downwardly with canard inner portion 54 even though portion 70 is in a rotated position relative to portion 54.

Figure 4:
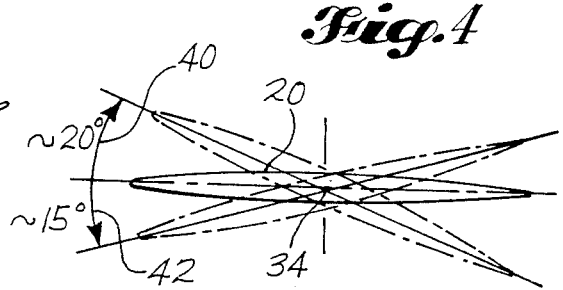
FIG. 4 is a profile view of a canard, showing a preferred range of incidences at which the canards can be set.

Housed within trunnion 72 is a rotary actuator (not shown in the figures), which has a torque shaft 80 extending outwardly from one end of the trunnion. Attached to the end of shaft 80 is a spline gear 82. The spline gear 82 is fixedly joined to the interior frame 84 of canard outer portion 70, as is best seen in FIG. 6. The rotary actuator turns shaft 80 and spline gear 82 for rotationally positioning canard portion 70 about trunnion 72. The rotary actuator has the capability to rotate the canard in either direction. Referring to FIG. 4 by way of example, in a preferred embodiment of the invention the rotary actuator can change the angle of incidence of canard portion 70 from $-15°$ to $+20°$ to carry out the above-described flight maneuvers. The rotary actuator can furthermore hold canard portion 70 in any incidence between these angles.

The above description of the invention is for illustrative purposes only. Other embodiments of the invention are possible without departing from the spirit and scope of the invention as is set forth in this application. The invention is not to be limited by the above description and illustrative figures in any way, other than those limitations which are set forth in the appended claims that follow.

What is claimed is:

1. An aircraft, comprising:
   a fuselage with a pilot's cockpit, and having an upwardly narrowing substantially triangular cross sectional configuration in the region of the cockpit;
   a pair of wings, one on each side of the fuselage;
   a tail section;
   a pair of canards, one mounted on each side of the fuselage forwardly of each wing and adjacent the cockpit region; and
   a means for mounting said canards to said fuselage for two-degree freedom of movement, with one degree including canard vertical swinging movement between a retracted position flush against the side of the fuselage and a downwardly extending position substantially parallel to the "z" axis of the aircraft, and with the second degree including canard rotational incidence-changing, wherein said means mounts each canard to said fuselage so that the inboard portions of said canards remain substantially adjacent said fuselage during said vertical swinging and incidence changing movement, said means for each canard comprising:

a powered hinge having an inner portion connected to the fuselage and an outer portion pivotally connected to said inner portion, said outer portion being movable to a selected position relative to said inner portion, and wherein said outer portion may be held in said selected position; and a trunnion housed in said canard and having first and second ends, with said first end being connected to said movable outer portion so that said trunnion vertically swings when said outer portion pivots relative to said inner portion, and with said canard being pivotally connected to said second end in a manner so that the inboard portion of said canard may remain substantially adjacent said fuselage during vertical swinging and incidence changing movement, and further, said trunnion including actuator means operable to pivot said canard relative to said trunnion, for changing the incidence position of said canard, and for holding the canard in a selected incidence position.

2. The invention in accordance with claim 1, including a drive motor operably connected to the hinge, to power the hinge for moving and holding said outer portion, with said motor being mounted to said fuselage.

3. The invention in accordance with claim 2, wherein said actuator means comprises a rotary actuator housed within said trunnion, said actuator having a powered torque shaft extending from the second end of said trunnion, with said torque shaft being joined to the canard for driving the canard about an axis established by the trunnion.

4. The invention in accordance with claim 3, including bearing means surrounding said trunnion for mounting the canard for rotation about said trunnion.

5. The invention in accordance with claim 4, wherein the range of incidence change is at least about $+20°$ to about $-15°$.

6. The invention in accordance with claim 2, including a pair of fairings connected to the fuselage, one on each side thereof, projecting outwardly therefrom, each fairing extending along a length of the fuselage and housing the inner portion of the hinge for the canard on its side of the fuselage.

7. The invention in accordance with claim 6, wherein said actuator means comprises a rotary actuator housed within said trunnion, said actuator having a powered torque shaft extending from the second end of said trunnion, said torque shaft being joined to the canard for driving the canard about an axis established by the trunnion.

8. The invention in accordance with claim 7, further comprising bearing means surrounding said trunnion for mounting the canard for rotation about said trunnion.

9. The invention in accordance with claim 8, wherein the range of incidence change is at least about $+20$ degrees to about $-15$ degrees.

* * * * *

UNITED STATES PATENT AND TRADEMARK OFFICE
CERTIFICATE OF CORRECTION

PATENT NO. : 4,542,866

DATED : September 24, 1985

INVENTOR(S) : Allan L. Caldwell, Richard Hardy and Frank D. Neumann

It is certified that error appears in the above-identified patent and that said Letters Patent are hereby corrected as shown below:

Column 5, line 44, "other" should be -- outer --.
Column 5, line 56, "the" should be -- The --.

Signed and Sealed this

Tenth Day of June 1986

[SEAL]

Attest:

DONALD J. QUIGG

Attesting Officer

Commissioner of Patents and Trademarks